US012696200B2

(12) United States Patent
Chen et al.

(10) Patent No.: US 12,696,200 B2
(45) Date of Patent: Jul. 28, 2026

(54) POWER CONTROL FOR SIMULTANEOUS PUSCH TO MULTIPLE TRP

(71) Applicant: MEDIATEK INC., Hsinchu (TW)

(72) Inventors: Yi-Ru Chen, Hsinchu (TW);
Cheng-Rung Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 193 days.

(21) Appl. No.: 18/371,532

(22) Filed: Sep. 22, 2023

(65) Prior Publication Data

US 2024/0114464 A1 Apr. 4, 2024

Related U.S. Application Data

(60) Provisional application No. 63/377,561, filed on Sep. 29, 2022.

(51) Int. Cl.
| | |
|---|---|
| *H04W 52/40* | (2009.01) |
| *H04W 52/14* | (2009.01) |
| *H04W 52/36* | (2009.01) |
| *H04W 52/42* | (2009.01) |

(52) U.S. Cl.
CPC ....... *H04W 52/365* (2013.01); *H04W 52/146* (2013.01); *H04W 52/367* (2013.01)

(58) Field of Classification Search
None
See application file for complete search history.

(56) References Cited

U.S. PATENT DOCUMENTS

| | | | | |
|---|---|---|---|---|
| 2022/0217653 A1* | 7/2022 | Kung | .................. | H04W 52/367 |
| 2023/0247560 A1* | 8/2023 | Zhang | ................ | H04W 52/365 |
| 2024/0031948 A1* | 1/2024 | Zhang | ................. | H04B 7/0404 |
| 2025/0261131 A1* | 8/2025 | Liu | .................. | H04W 72/1268 |

FOREIGN PATENT DOCUMENTS

| | | | | | |
|---|---|---|---|---|---|
| CN | 117461363 A | * | 1/2024 | ......... | H04W 52/365 |
| CN | 117581600 A | * | 2/2024 | ........... | H04W 52/40 |
| JP | 2022549725 A | * | 11/2022 | .......... | H04W 72/569 |
| JP | 2023518807 A | * | 5/2023 | ........... | H04B 17/328 |

OTHER PUBLICATIONS

3GPP TSC RAN WG1 #107-e, R1-2112090, e-Meeting, Nov. 11-19, 2021.
European Search Report, Feb. 22, 2024, Germany.
"3rd Generation Partnership Project; Technical Specification Group Radio Access Network; NR; Medium Access Control (MAC) protocol specification (Release 17)",3GPP Standard; Technical Specification; 3GPP TS 38.321, 3rd Generation Partnership Project (3GPP), Mobile Competence Centre ; 650, Route Des Lucioles ; F-06921 Sophia-Antipolis Cedex ; France,vol. RAN WG2, No. V17.1.0 Jul. 20, 2022 (Jul. 20, 2022), pp. 1-241, XP052183760.
European Patent Office, "Office Action", Dec. 23, 2025, Germany.

* cited by examiner

*Primary Examiner* — Mohammed Rachedine
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE determines to send a first power headroom report (PHR) and a second PHR. The UE receives a resource allocation for a physical uplink shared channel (PUSCH). The UE includes the first PHR and the second PHR in a MAC control element (MAC CE). The UE transmits the PUSCH including the MAC CE.

10 Claims, 11 Drawing Sheets

400

402

PDCCH

UL Data

Common
UL Burst

POWER CONTROL FOR SIMULTANEOUS PUSCH TO MULTIPLE TRP

CROSS-REFERENCE TO RELATED APPLICATION(S)

This application claims the benefits of U.S. Provisional Application Ser. No. 63/377,561, entitled "POWER CONTROL FOR SIMULTANEOUS PUSCH TO MULTIPLE TRP" and filed on Sep. 29, 2022, which is expressly incorporated by reference herein in their entirety.

BACKGROUND

Field

The present disclosure relates generally to communication systems, and more particularly, to techniques of transmitting power headroom reports (PHRs) in multiple transmission/reception point (multi-TRP) operations.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines to send a first power headroom report (PHR) and a second PHR. The UE receives a resource allocation for a physical uplink shared channel (PUSCH). The UE includes the first PHR and the second PHR in a MAC control element (MAC CE). The UE transmits the PUSCH including the MAC CE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
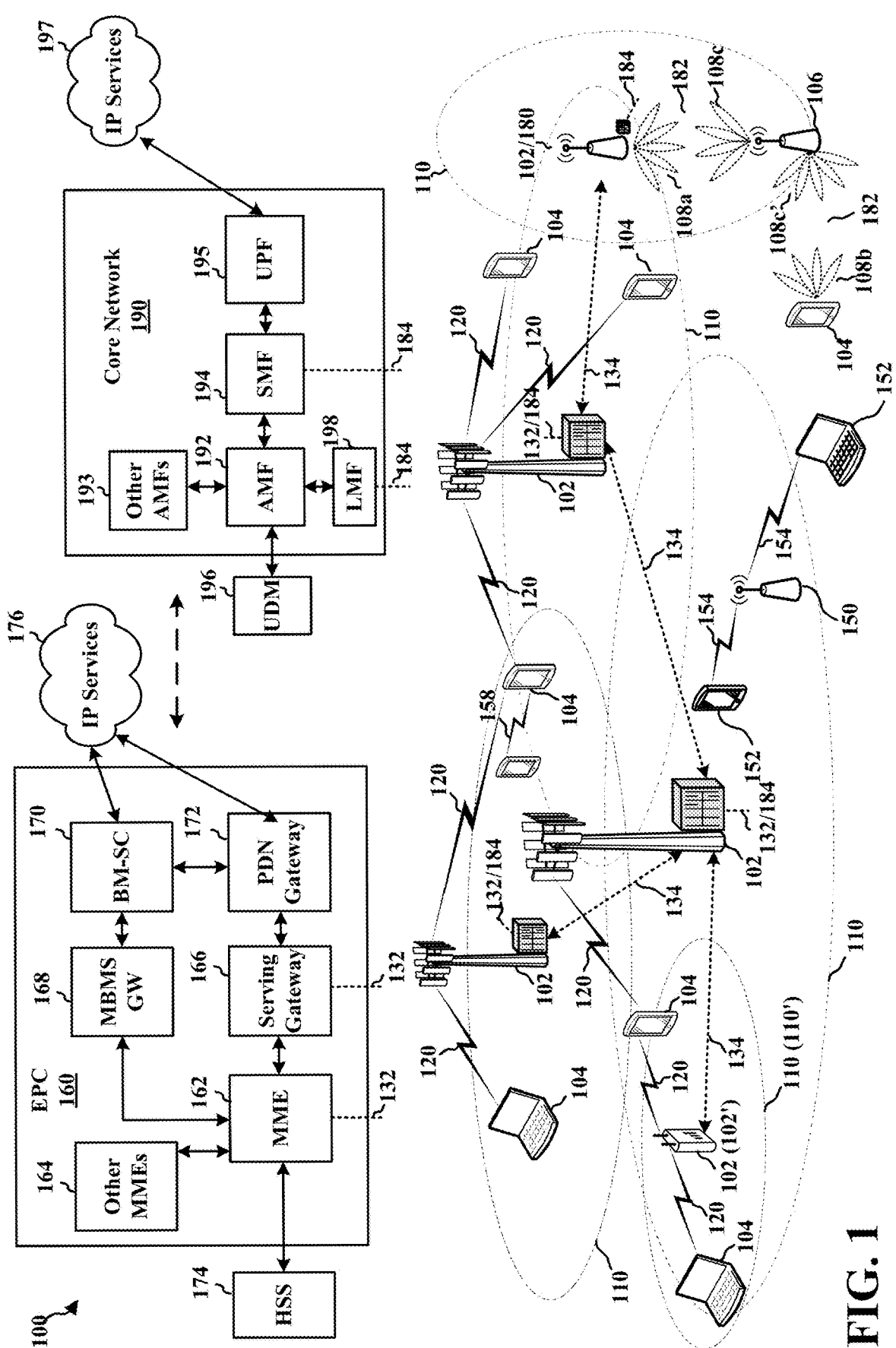
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
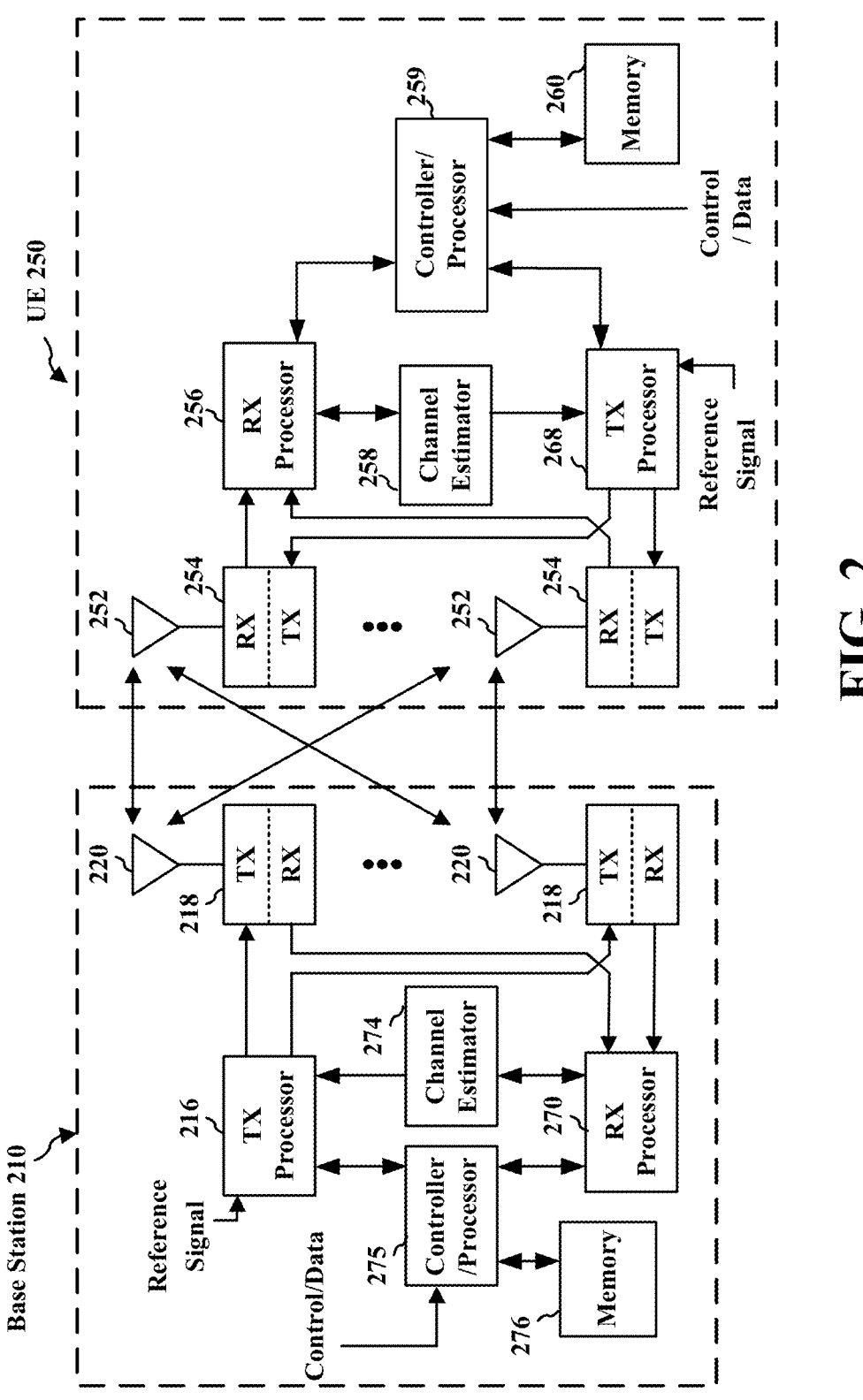
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), resegmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms.

Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
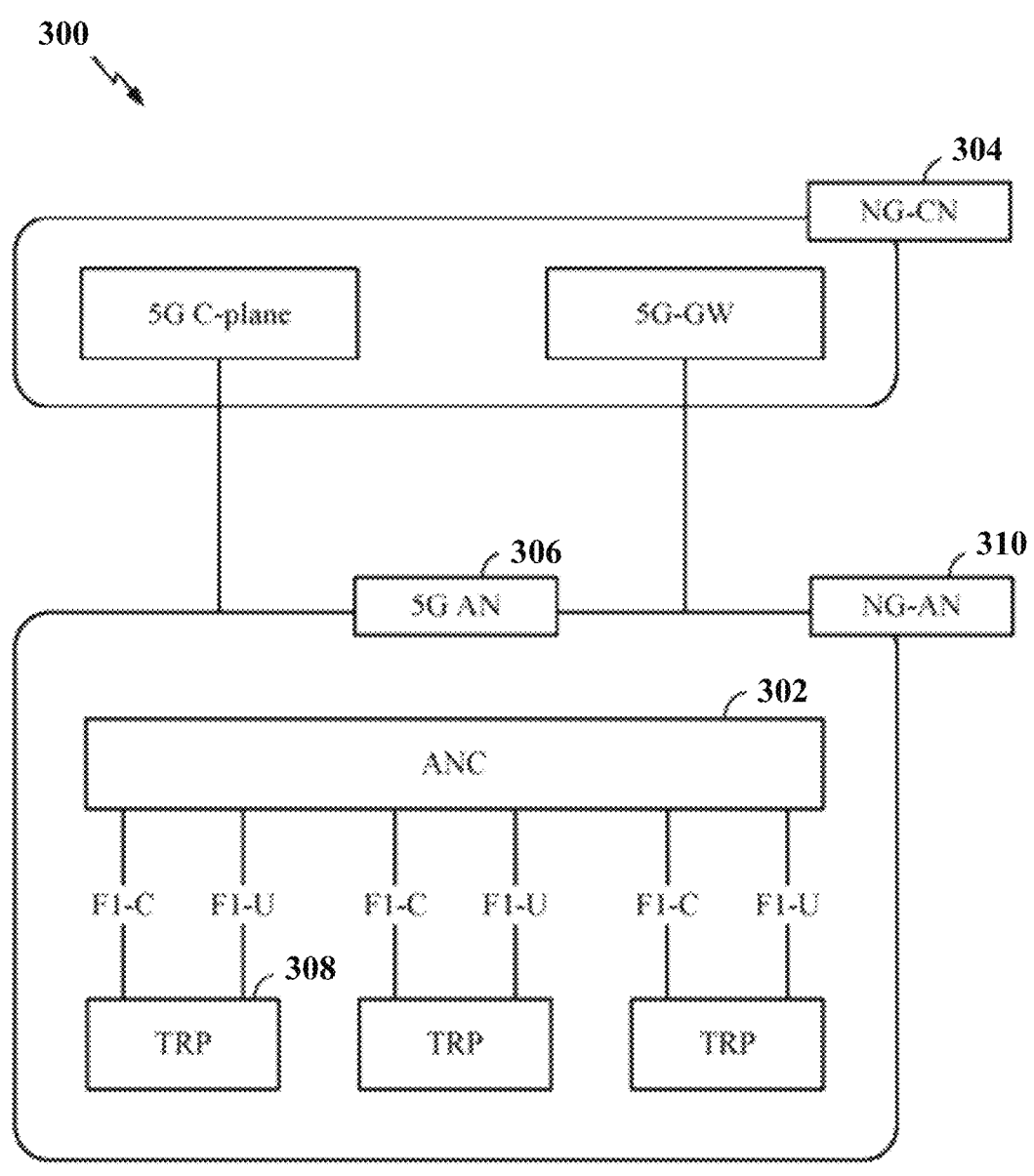
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
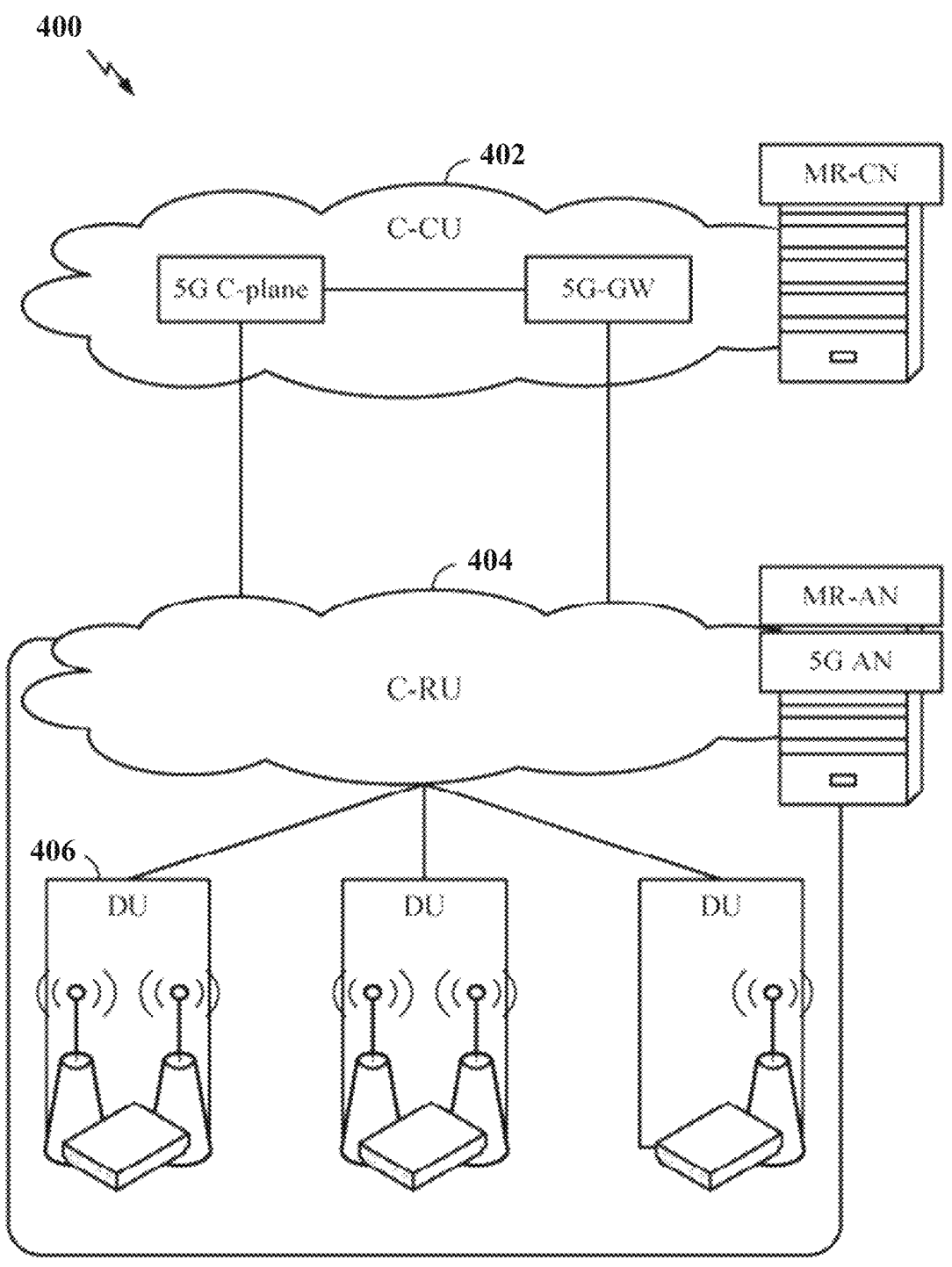
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
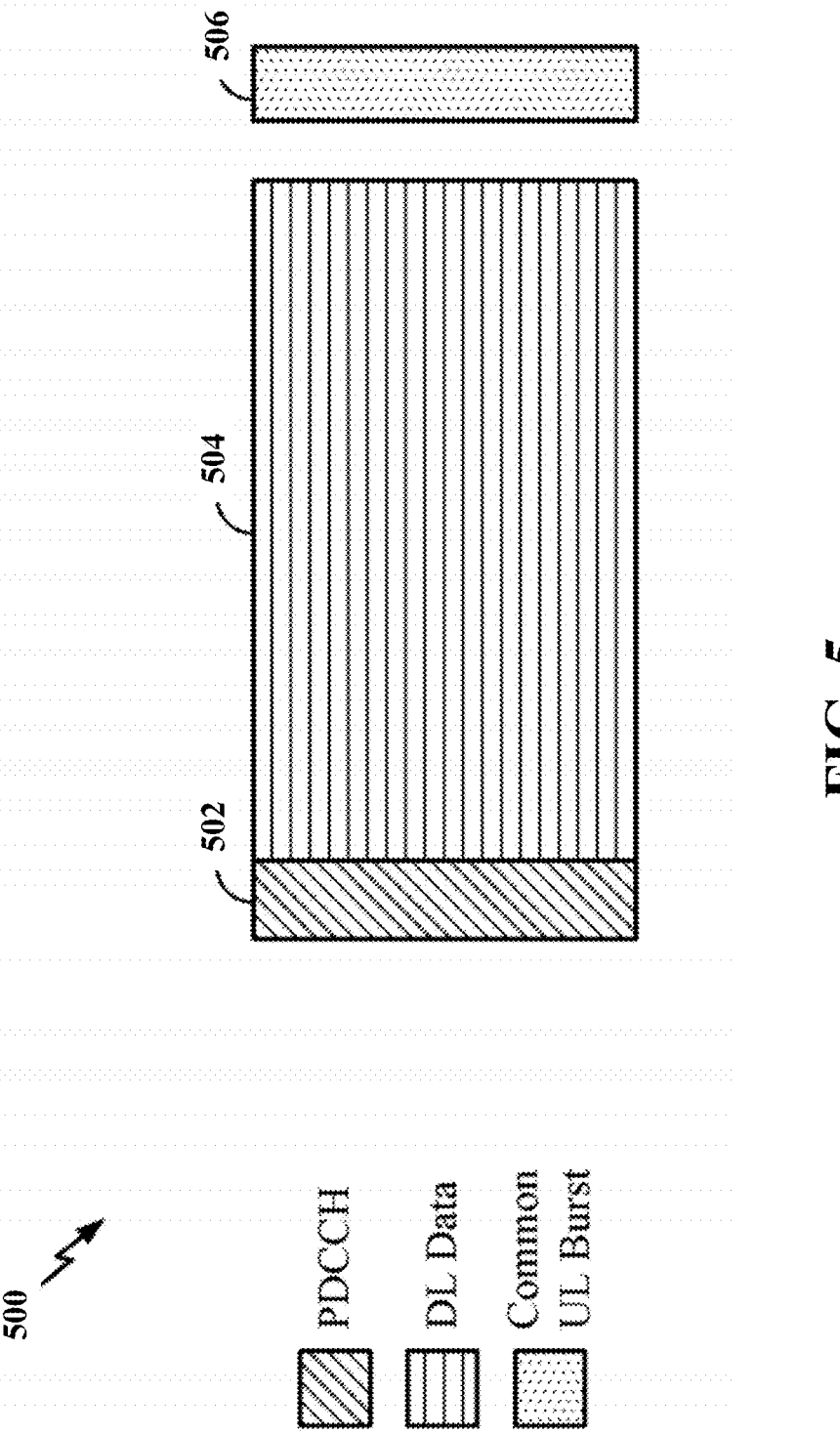
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
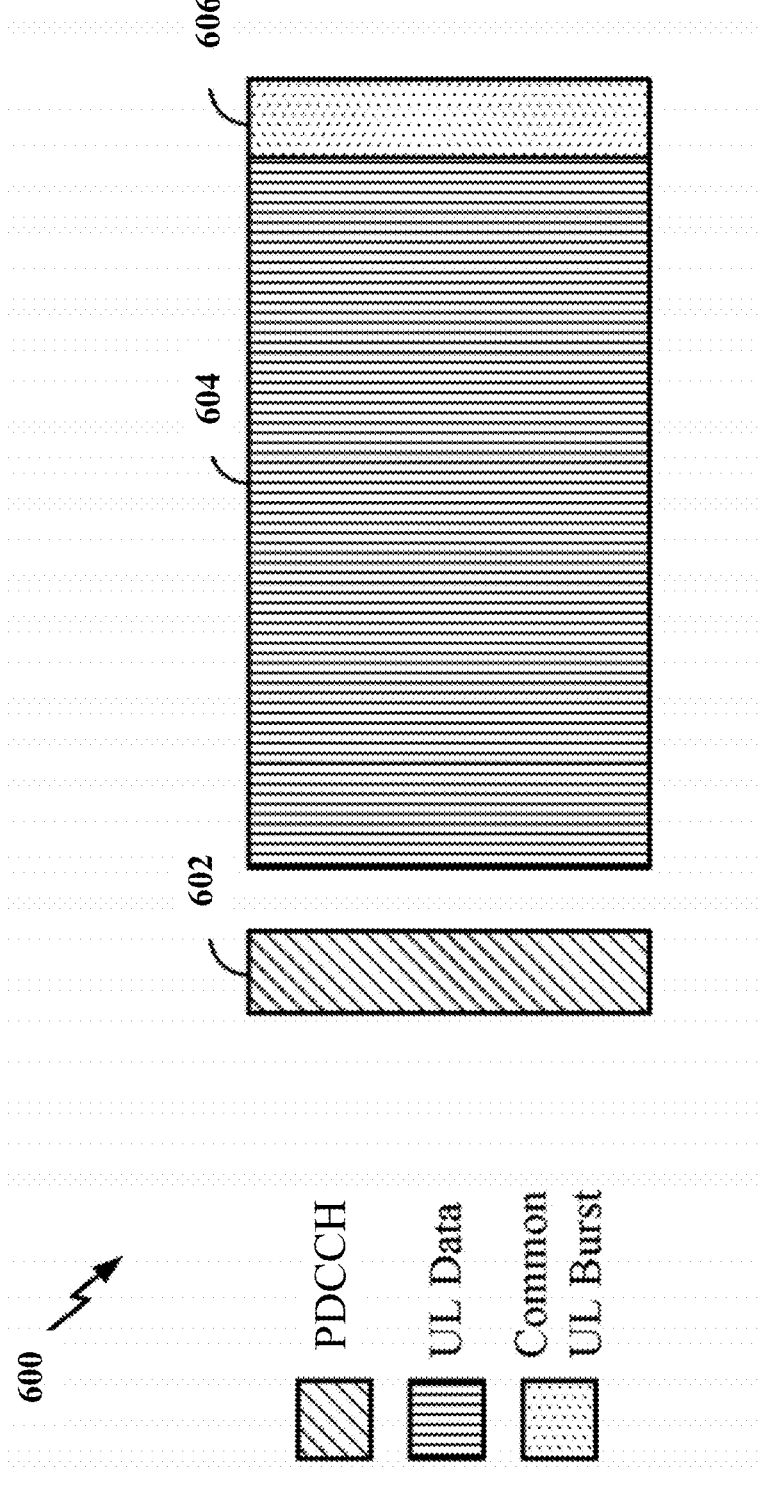
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Power headroom reporting is a mechanism used by UE to report its available transmit power to the base station. The purpose of power headroom reporting is to allow the base station to effectively manage the resources and allocate appropriate power levels to UEs. By knowing the power headroom of each UE, the base station can make informed decisions regarding resource allocation and power control, ensuring efficient and reliable communication.

Power headroom (PH) refers to the difference between the maximum transmit power of the UE and the actual power level it is currently using. It represents the UE's capability to increase its transmit power without exceeding the limits. PH is positive in value means UE is still capable to send at higher transmission power or it is capable of transmitting at higher throughput. The base station may allocate more resource blocks to the UE. PH is negative in value means UE is already transmitting more power than allowed.

The PH can be classified into two types: actual PH and virtual PH. Actual PH is determined based on actual PUSCH transmission. The power headroom is calculated using the actual transmission power of the current PUSCH transmission. Virtual PH is determined based on reference format. The power headroom is calculated using a reference PUSCH format and transmission power specified by the gNB.

An actual power headroom, based on an actual PUSCH transmission, for PUSCH transmission occasion i on active UL BWP b of carrier f of serving cell c, may be calculated according to the below equation:

$$PH_{b,f,c}(i, j, q_d, l) =$$
$$P_{CMAX,f,c}(i) - \{P_{O\_PUSCH,b,f,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\}.$$

This equation calculates the power headroom (PH) value. $PH_{b,f,c}$ denotes power headroom in BWP b, carrier f, serving cell c. i denotes PUSCH occasion index. j denotes PUSCH power control adjustment state index. $q_d$ denotes Pathloss reference index. l denotes Closed loop adjustment state index. $P_{CMAX,f,c}$ denotes UE max transmit power in carrier f, cell c. $P_{O_{PUSCH,b,f,c}}$ denotes PUSCH transmit power based on configuration.

$$M_{RB,b,f,c}^{PUSCH}$$

denotes PUSCH resource block allocation. $\alpha_{b,f,c}$ denotes PUSCH power control adjustment. $PL_{b,f,c}$ denotes Downlink pathloss estimate. $\Delta_{TF,b,f,c}$ denotes Modulation dependent adjustment. $f_{b,f,c}$ denotes Closed loop power control adjustment. This equation calculates the PH as the difference between the max UE power and the estimated PUSCH transmit power based on the allocation, pathloss, power control, etc.

A virtual power headroom can be calculated based on a reference format as represented by the below equations with the same notations used in the above equation calculating an actual power headroom.

$$PH_{b,f,c}(i,j,q_d,l) = P_{CMAX,f,c}(i) - \{P_{O\_PUSCH,b,f,c}(j) + \alpha_{b,f,c}(j) \cdot PL_{b,f,c}(q_d) + f_{b,f,c}(i,l)\}$$

A UE uses MAC CE to transmit a PH value, which indicates the headroom between the current UE transmission power (estimated power) and the nominal power. A PH value may be also referred to as PH or power headroom report (PHR). The base station uses this report value to estimate how much uplink bandwidth a UE can use for a specific subframe. Since the more resource block the UE is using, the higher UE transmission power gets, but the UE transmission power should not exceed the max power defined in the specification. So, the UE cannot use much resource block (bandwidth) if it does not have enough power headroom.

The PH value can be configured either for periodic reporting at the UE or when the downlink pathloss changes by a specific amount. For periodic reporting, a report is triggered by the expiration of a timer at the UE that is configured by the PERIODIC PHR TIMER parameter, which can be configured with values between 10 ms and infinity. For threshold reporting, a PH reporting is triggered when the pathloss changes by a value that is configured by the DL PathlossChange parameter (e.g., 1, 3, 6, or infinite dB).

Whether a PH value is actual or virtual depends on whether there is UL-SCH data included in the PUSCH transmission carrying the PH: if PUSCH contains data (UL-SCH), actual PH value is reported; if PUSCH does not contain data, virtual PH value is reported.

For an actual PH value, the UE calculates the PH using the actual PUSCH transmission power based on the current allocation. For a virtual PH value, the UE calculates the PH based on a reference PUSCH format and transmission power specified by the gNB. This reference format can include configured grant configuration, SRS transmission parameters, and other reference signals.

Figure 7:
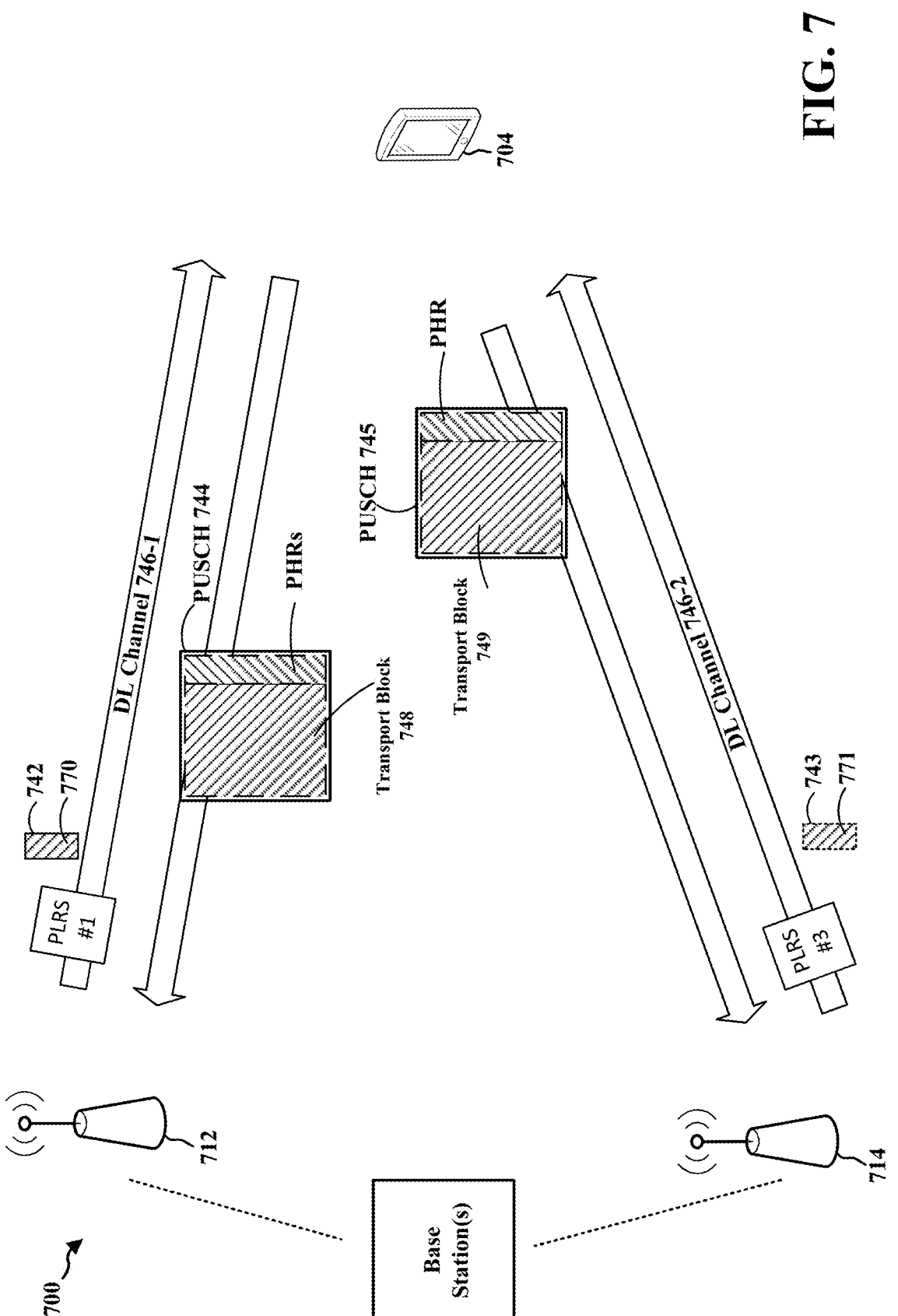
FIG. 7 is a diagram illustrating PH reporting in a single DCI based multi-TRP operation.

FIG. 7 is a diagram 700 illustrating PH reporting in a multi-DCI based multi-TRP operation. In this example, one or more base stations 702 may communicate, through a TRP 712 and a TRP 714, with a UE 704. The base station 702 may transmit a PDCCH 742 which carries a downlink control information (DCI) 770 to the UE 704 through one of the TRP 712 or the TRP 714. In this example, the DCI 770 schedules a PUSCH 744 directed to the TRP 712 and a PUSCH 745 directed to the TRP 714. In another example, the DCI 770 only schedules the PUSCH 744 directed to the TRP 712. DCI 771, carried by a PDCCH 743 transmitted from the TRP 714, schedules the PUSCH 745 directed to the TRP 714.

The UE 704 transmits each PUSCH using a spatial domain filter specifically associated with the corresponding TRP. For example, the UE transmits PUSCH 744 using a first spatial domain filter matched to the first TRP 712. And the UE transmits PUSCH 745 using a second spatial domain filter matched to the second TRP 714. By using TRP-specific spatial filters, each PUSCH is associated with the corresponding TRP that the spatial filter is designed for. This enables the proper PH values to be reported for each TRP based on the actual PUSCH transmissions from the UE. FIG. 7 shows that the UE 704 transmits the two separate PUSCH 744 and PUSCH 745 in one example. In another example, the UE 704 may use the first and the second spatial filters to transmit the same PUSCH (e.g., only one of the PUSCH 744 and the PUSCH 745) to the TRP 712 and the TRP 714. The techniques described infra apply to both examples.

Pathloss Reference Signals (PL RSs) are downlink reference signals that the UE uses to measure downlink pathloss from the base station. PL-RSs may be Channel State Information Reference Signals (CSI-RSs), Synchronization Signal Blocks (SSBs), Interference Measurement Resources (IMRs), Demodulation Reference Signal (DMRSs), etc.

In this example, the TRP 712 transmits PL-RSs #1 through a DL channel 746-1 to the UE 704 periodically and the TRP 714 transmits PL-RSs #3 through a DL channel 746-2 to the UE 704 periodically. The UE 704 keeps monitoring the PL-RS #1 and PL-RS #3. The UE 704 may report PH value periodically or when detecting that the pathloss (determined based the measurements of the PL RSs) changes more than a threshold such as a value indicated by a configured parameter DL PathlossChange.

Upon the UE 704 determines that a PH value is to be reported, the UE 704 waits for the PDCCH 742 and sends the PH value in one or both of the PUSCH 744 and the PUSCH 745 as described infra.

The UE 704 determines whether there are data to be transmitted in each of the PUSCH 744 and the PUSCH 745. When only one of the PUSCH 744 and the PUSCH 745 will carry data, the UE 704 includes the PH values for both of the PUSCHs in the one PUSCH that carries data. For example, the UE 704 may determine that a TB 748 is carried in the PUSCH 744 and no data is carried in the PUSCH 745. Accordingly, the UE 704 includes a first PH value and a second PH value in the PUSCH 744. More specifically, the first PH value is an actual PH value associated with the PUSCH 744 directed the TRP 712; the second PH value is a virtual PH value associated with the PUSCH 745 directed to the TRP 714 (as no actual data is carried in the PUSCH 745).

In another example, when the UE 704 determines that a TB 749 is carried in the PUSCH 745 and no data is carried in the PUSCH 744, the UE 704 includes the first PH value and the second PH value in the PUSCH 745. Specifically, the first PH value is an actual PH value associated with the PUSCH 745 directed to the TRP 714; the second PH value is a virtual PH value associated with the PUSCH 744 directed to the TRP 712 (as no actual data is carried in the PUSCH 744);

In yet another example, when the UE 704 determines that both the PUSCH 744 and the PUSCH 745 will carry data (e.g., TBs 748 and 749), the UE 704 includes the first PH value and the second PH value in either the PUSCH 744 or the PUSCH 745. In this case, both the first PH value and the second PH value are actual PH values since both PUSCHs carry data.

Finally, when the UE 704 determines that neither the PUSCH 744 nor the PUSCH 745 will carry data, the UE 704 includes the first PH value and the second PH value in either the PUSCH 744 or the PUSCH 745. Here, both the first PH value and the second PH value are virtual PH values since neither PUSCH carries data.

Figure 8:
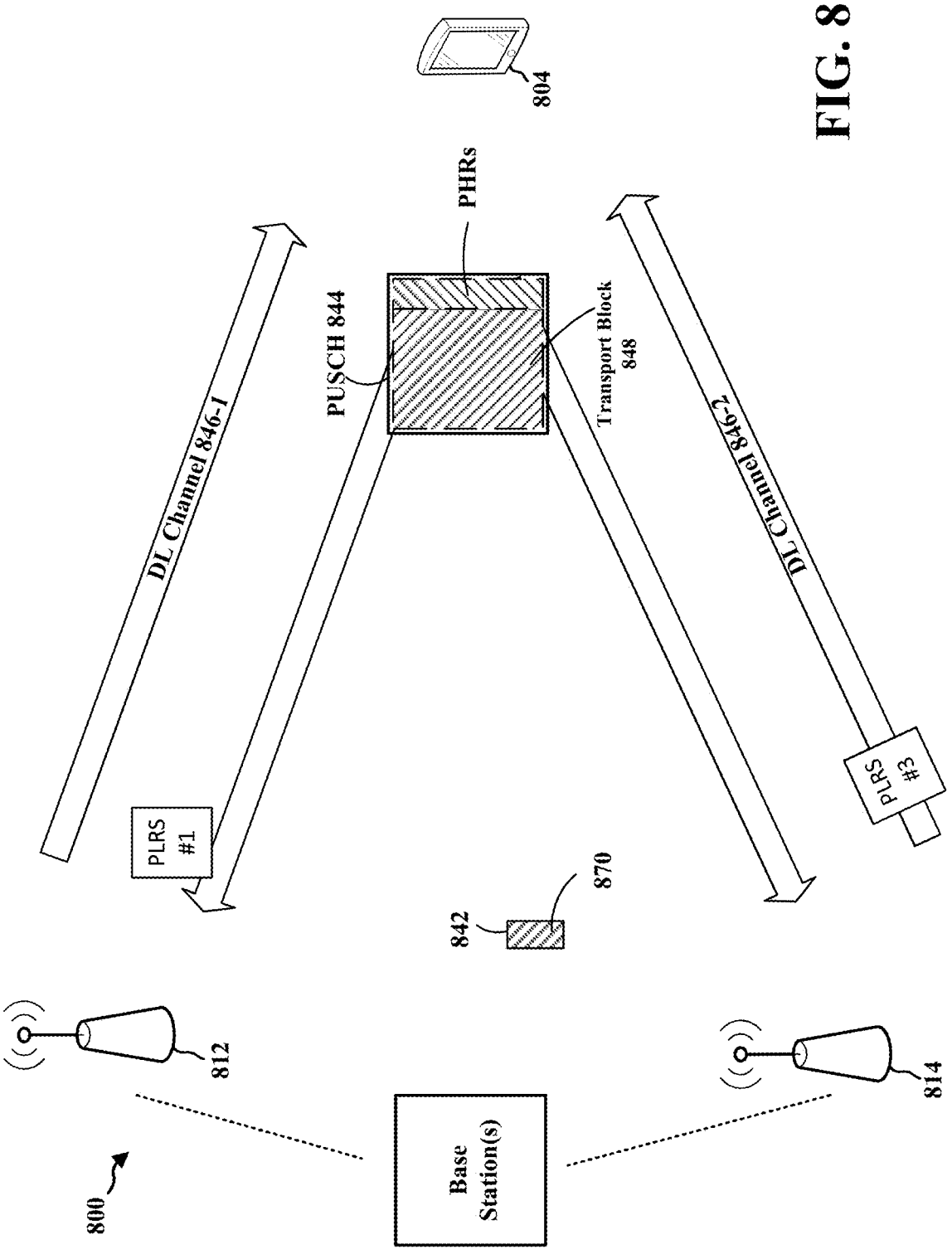

FIG. 8 is a diagram 800 illustrating PH reporting in a single DCI based multi-TRP operation. In this example, one or more base stations 802 may communicate, through a TRP 812 and a TRP 814, with a UE 804. The base station 802 may transmit a PDCCH 842 which carries a downlink control information (DCI) 870 to the UE 804 through one of the TRP 812 or the TRP 814. In this example, the DCI 870 schedules a single PUSCH 844 that will be transmitted to both the TRP 812 and the TRP 814. In particular, the UE 804 may use a set of antennas to transmit the PUSCH using a spatial domain filter specifically associated with the corresponding TRP. For example, the UE may transmit, through a first set of antennas, the PUSCH 844 using a first spatial domain filter matched to the first TRP 812. And the UE may transmit, through a second set of antennas, the same PUSCH 844 using a second spatial domain filter matched to the second TRP 814.

In this example, the TRP 812 transmits PL-RSs #1 through a DL channel 846-1 to the UE 804 periodically and the TRP 814 transmits PL-RSs #3 through a DL channel 846-2 to the UE 804 periodically. The UE 804 keeps monitoring the PL-RS #1 and PL-RS #3. The UE 804 may report PH values periodically or when detecting that the pathloss (determined based the measurements of the PL RSs) changes more than a threshold such as a value indicated by a configured parameter DL PathlossChange.

Upon the UE 804 determines that a PH value is to be reported, the UE 804 waits for the PDCCH 842 scheduling the PUSCH 844. The UE 804 determines whether there are data to be transmitted in the PUSCH 844. When the PUSCH 844 will carry data, the UE 804 includes actual PH values associated with both TRPs in the PUSCH 844.

In one example, when the UE 804 determines that the PUSCH 844 will carry data (e.g., TB 848) and will be transmitted to both the TRP 812 and the TRP 814, the UE 804 includes a first PH value associated with the TRP 812 and the second PH value associated with the TRP 814 in the PUSCH 844. In this case, both the first PH value and the second PH value are actual PH values.

In another example, the UE 804 may determine that the PUSCH 844 will carry the TB 848 and will only be transmitted to the TRP 812. Accordingly, the UE 804 includes a first PH value and a second PH value in the PUSCH 844. More specifically, the first PH value is an actual PH value associated with the TRP 812; the second PH value is a virtual PH value associated with the TRP 814 and calculated based on a reference format.

In another example, the UE 804 may determine that the PUSCH 844 will carry the TB 848 and will only be transmitted to the TRP 814. Accordingly, the UE 804 includes a first PH value and a second PH value in the PUSCH 844. More specifically, the first PH value is an actual PH value associated with the TRP 814; the second PH value is a virtual PH value associated with the TRP 812 and calculated based on a reference format.

In another example, when the UE 804 determines that the PUSCH 844 will not carry data and will be transmitted to either or both the TRP 812 and the TRP 814, the UE 804 includes the first PH value and the second PH value in the PUSCH 844. Specifically, the first PH value is a virtual PH value associated with the TRP 812 and may be calculated based on a reference format; the second PH value is a virtual PH value associated with the TRP 814 and may be calculated based on a reference format.

Figure 9:
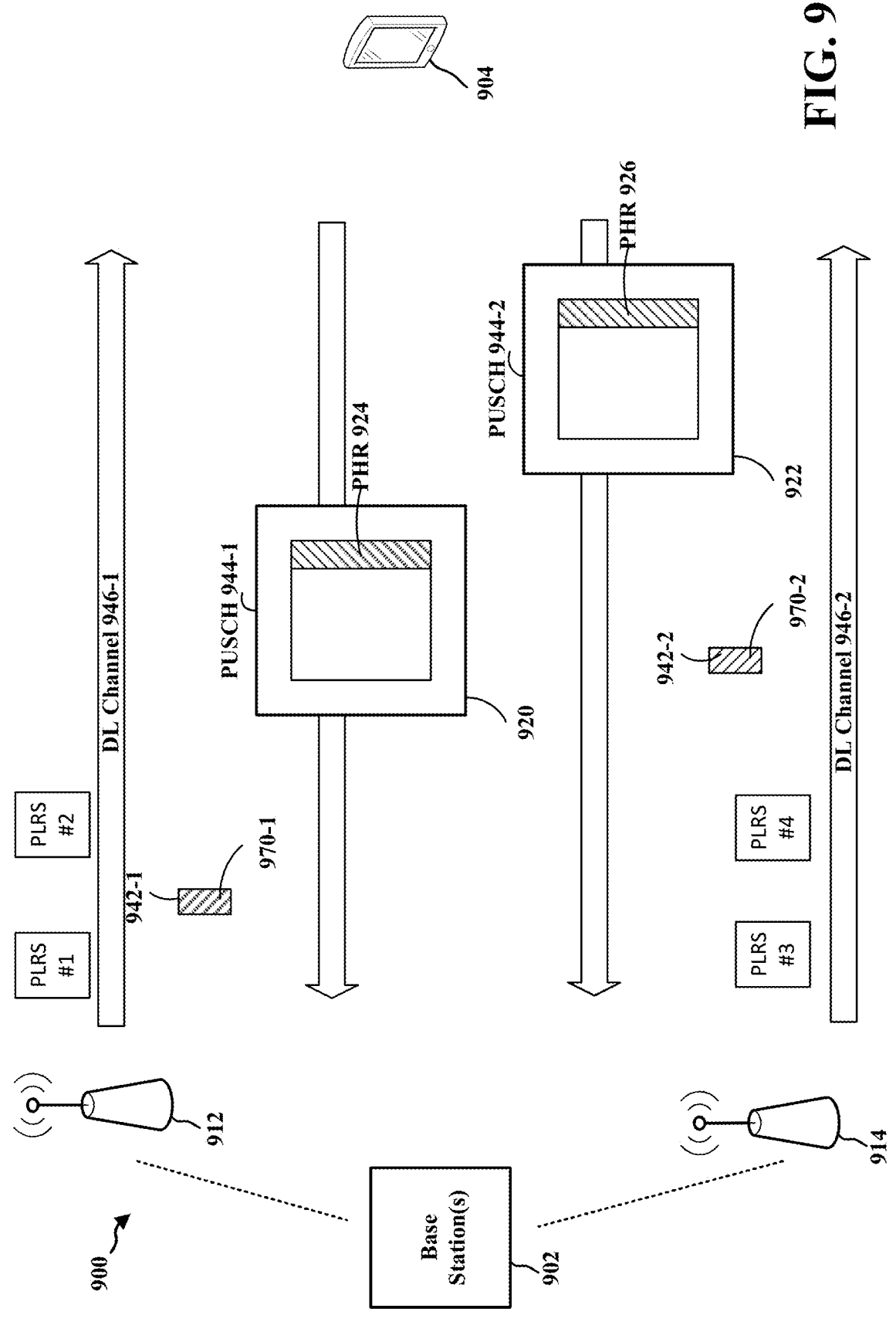
FIG. 9 is a diagram illustrating PH reporting in a multiple DCI based multi-TRP operation.

FIG. 9 is a diagram 900 illustrating PH reporting in a multiple DCI based multi-TRP operation. One or more base stations 902 may communicate with the UE 904 through a TRP 912 and a TRP 914. In this example, the TRP 912 transmits to the UE 904 a PDCCH 942 carrying downlink control information (DCI) 970-1. The DCI 970-1 schedules transmission of a PUSCH 944-1 directed to the TRP 912. The TRP 914 transmits to the UE 904 a PDCCH 942-2 carrying DCI 970-2. The DCI 970-2 schedules transmission of a PUSCH 944-2 directed to the TRP 914. The PUSCH 944-1 and the PUSCH 944-2 may be non-overlapped, partially overlapped, or fully-overlapped.

In this example, the TRP 912 transmits PL-RSs #1 through a DL channel 946-1 to the UE 904 periodically and indicates to the UE 904 that a TCI state #1 is associated with the transmission the PL-RSs #1. Further, the TRP 912 transmits PL-RSs #2 through the DL channel 946-1 to the UE 904 periodically and indicates to the UE 904 that a TCI state #2 is associated with the transmission the PL-RSs #2. The TRP 912 may transmits other PL RSs and indicates other associated TCI states. The UE 904 groups those TCI states in a group corresponding to the TRP 912.

Similarly, the TRP 914 transmits PL-RSs #3 through a DL channel 946-2 to the UE 904 periodically and indicates to the UE 904 that a TCI state #3 is associated with the transmission the PL-RSs #3. Further, the TRP 914 transmits PL-RSs #4 through the DL channel 946-2 to the UE 904 periodically and indicates to the UE 904 that a TCI state #4 is associated with the transmission the PL-RSs #4. The TRP 914 may transmits other PL RSs and indicates other associated TCI states. The UE 904 groups those TCI states in a group corresponding to the TRP 914.

By grouping the TCI states and the associated resources into TRP specific groups, the UE 904 can monitor pathloss and trigger PH reporting independently for each TRP. More specifically, the UE 904 monitors PL RSs whose TCI states are in the same TCI group to determine pathloss changes and whether to trigger PH reporting. In other words, the UE 904 monitors PL RSs from a particular TRP to determine whether pathloss changes associated with that particular TRP should trigger PH reporting. For example, the UE 904 may initially measure the PL RS #1 and subsequently measure the PL RS #2 from the TRP 912. For example, the PL RS #1 may be a CSI-RS and the PL RS #2 may be an SSB. The UE 904 compares the pathloss change between these two PL RSs to determine if the change exceeds a configured threshold. If so, the UE 904 triggers a PH report for the TRP 912.

Similarly, the UE 904 monitors the PL RS #3 and PL RS #4 from the TRP 914. The UE 904 compares the pathloss change between these two PL RSs to determine if the change exceeds the configured threshold. If so, the UE 904 triggers a PH report for the TRP 914. In this way, the UE 904 triggers PH reports on a per-TRP basis by monitoring PL RSs corresponding to the same TRP based on their TCI state associations.

The UE 904 reports the triggered PH value when it has UL resources allocated for transmission to the corresponding TRP. For example, upon determining that a PH report 924 should be triggered for the TRP 912, the UE 904 waits for the PDCCH 942-1 scheduling the PUSCH 944-1 directed to the TRP 912 and includes a PH report 924 for the TRP 912 in an MAC CE of the PUSCH 944-1. When the PUSCH 944-1 carries data (a TB), the PH report 924 is an actual PH report. When the PUSCH 944-1 does not carry data, the PH report 924 is a virtual PH report calculated based on a reference format.

Likewise, upon determining that a PH report 926 should be triggered for the TRP 914, the UE 904 waits for the PDCCH 942-2 scheduling PUSCH 944-2 directed to the TRP 914 and includes the PH report 926 for the TRP 914 in an MAC CE of the PUSCH 944-2. When the PUSCH 944-2 carries data (e.g., a TB), the PH report 926 is an actual PH report. When the PUSCH 944-2 does not carry data, the PH report 926 is a virtual PH report calculated based on a reference format. Such a mechanism may avoid the issue of PH reports being incorrectly triggered by pathloss changes on different TRPs.

Figure 10:
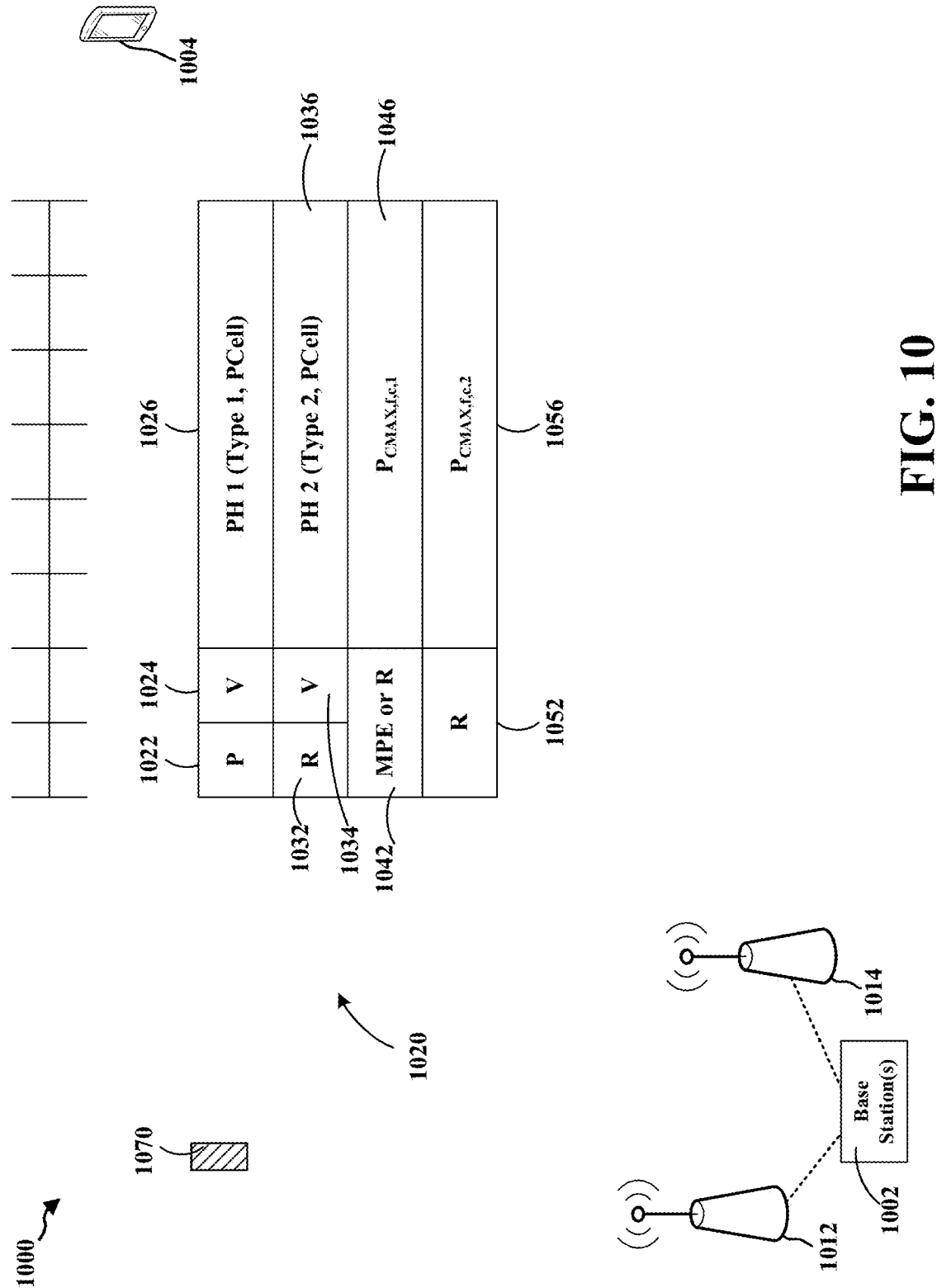
FIG. 10 is a diagram illustrating MAC CE format for carrying a PH value.

FIG. 10 is a diagram 1000 illustrating MAC CE format for carrying a power headroom report (PH value). In this example, the UE 1004 concurrently communicate with a TRP 1012 and a TRP 1014, which may be controlled by one or more base stations 1002. The UE 1004 may transmit an MAC CE 1020, through the TRP 1012 and/or the TRP 1014, to the base station 1002 for reporting the power headroom values when the PH value trigger condition is met.

The MAC CE 1020 has a fixed size and consists of 4 octets. The first octet includes a P field 1022, a V field 1024, and a PH 1 field 1026. The P field 1022 (1 bit) indicates whether power backoff is applied for the UE 1004. The V field 1024 (1 bit) indicates if PH 1 is based on actual PUSCH or reference format. The PH 1 field 1026 (6 bits) indicates a power headroom level for the TRP 712.

The second octet includes a R field 1032, a V field 1034, and a PH 2 field 1036. The R field 1032 (1 bit) in a reserved bit. The V field 1034 (1 bit) indicates if PH 2 is based on actual PUSCH or reference format. The PH 2 field 1036 (6 bits) indicates a power headroom level for the TRP 714.

The third octet includes a MPE or R field 1042 and a $P_{CMAX,f,c,1}$ field 1046. The MPE or R field 1042 (2 bits), if configured as a MPE field, indicates a power backoff to meet MPE requirements. Otherwise, the bits are reserved bits. The $P_{CMAX,f,c,1}$ field 1046 (6 bits) indicates a maximum TX power allowed for transmission to the TRP 712.

The fourth octet includes a R field 1052 and a $P_{CMAX,f,c,2}$ field 1056. The R field 1042 (2 bits) contains reserved bits. The $P_{CMAX,f,c,2}$ field 1046 (6 bits) indicates a maximum TX power allowed for transmission to the TRP 714.

By including two separate $P_{CMAX}$ fields for each TRP, the MAC CE enables the UE 1004 to report different maximum transmit power configurations for the TRP 1012 and the TRP 1014. This allows the network to be aware of the UE's per-TRP power limitations when performing scheduling for simultaneous transmission to multiple TRPs.

Figure 11:
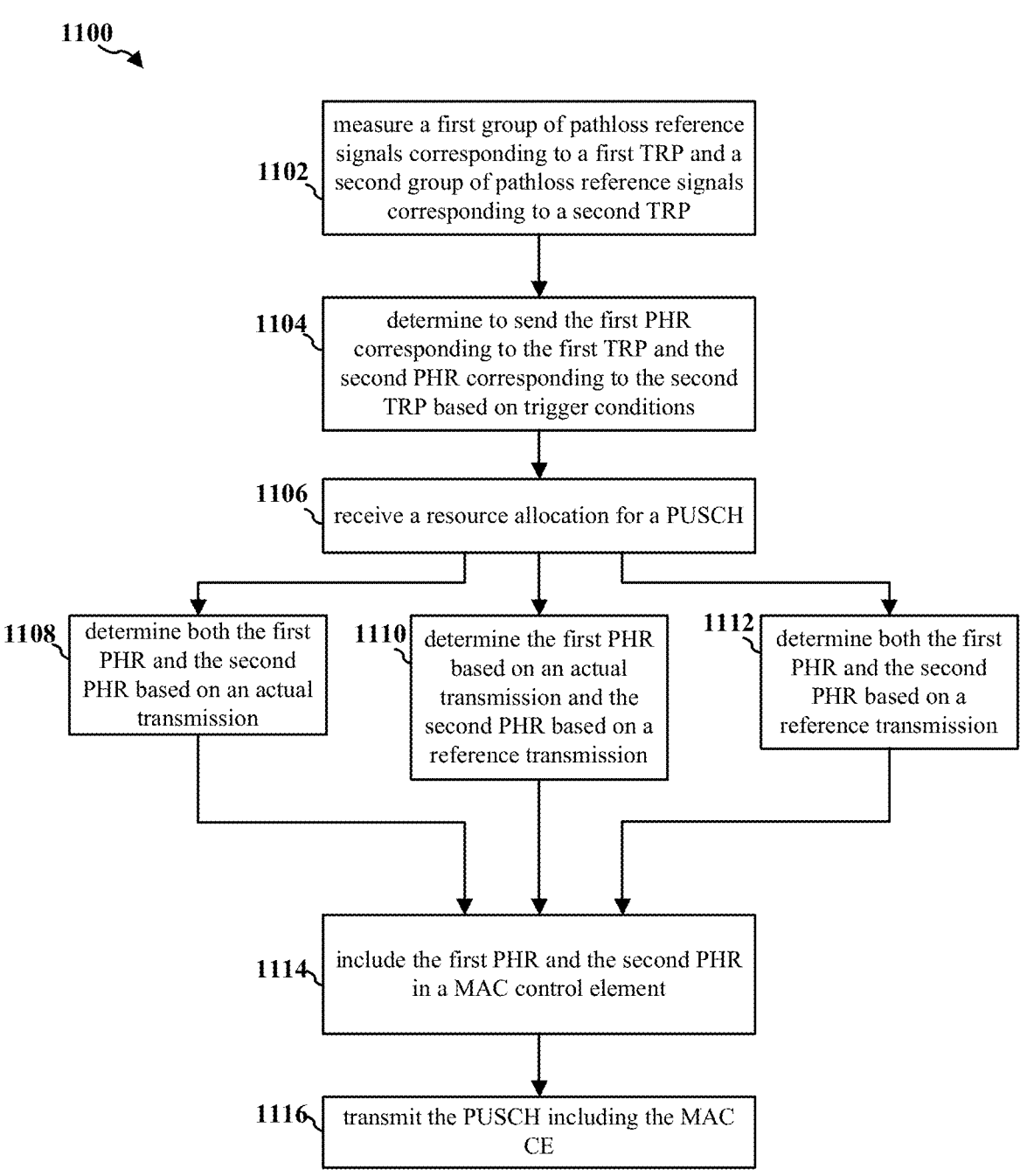
FIG. 11 is a flow chart of a method (process) for transmitting PH values.

FIG. 11 is a flow chart 1100 of a method (process) for transmitting PH values. The method may be performed by a user equipment (the UE 704, the UE 904, the UE 1004, the UE 250). In operation 1102, the UE measures a first group of pathloss reference signals corresponding to a first TRP and a second group of pathloss reference signals corresponding to a second TRP. In certain configurations, the first group of pathloss reference signals corresponding to the first TRP are determined from TCI states corresponding to the first TRP. In certain configurations, the second group of pathloss reference signals corresponding to the second TRP are determined from TCI states corresponding to the second TRP.

In operation 1104, the UE determines to send the first PH value corresponding to the first TRP and the second PH value corresponding to the second TRP, when (a) a first trigger condition is met based on the measurements of the first group of pathloss reference signals or (b) a second trigger condition is met based on the measurements of the second group of pathloss reference signals.

In operation 1106, the UE receives a resource allocation for a physical uplink shared channel (PUSCH). In certain configurations, the determination to send the first PH value and the second PH value is made when an RRC configuration is received by the UE.

When the PUSCH is associated with a first TRP and a second TRP, in operation 1108, the UE determines both the first PH value and the second PH value based on an actual transmission. The PUSCH is associated with the first TRP and the second TRP when the UE transmits the PUSCH using a first spatial domain filter corresponding to the first TRP and a second spatial domain filter corresponding to the second TRP.

When the PUSCH is associated with one of the first TRP or the second TRP and not the other, in operation 1110, the UE determines the first PH value based on an actual transmission and the second PH value based on a reference transmission. The PUSCH is associated with one of the first TRP and the second TRP when the UE transmits the PUSCH using one of a first spatial domain filter corresponding to the first TRP and a second spatial domain filter corresponding to the second TRP.

When the PUSCH is not associated with a first TRP or a second TRP, in operation 1112, the UE determines both the first PH value and the second PH value based on a reference transmission.

In certain configurations, the UE determines the first PH value based on a first maximum transmit power corresponding to a first TRP and the second PH value based on a second maximum transmit power corresponding to a second TRP.

In operation 1114, the UE includes the first PH value and the second PH value in a MAC control element (MAC CE). In certain configurations, the UE includes the first maximum transmit power corresponding to the first TRP and the second maximum transmit power corresponding to the second TRP in the MAC CE. In operation 1116, the UE transmits the PUSCH including the MAC CE.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of user equipment (UE), comprising:

determining to send a first power headroom report (PHR) and a second PHR;

receiving a resource allocation for a physical uplink shared channel (PUSCH), wherein the PUSCH is transmitted using a first spatial domain filter corresponding to a first transmission/reception point (TRP) and a second spatial domain filter corresponding to a second TRP;

determining the first PHR based on an actual transmission for the PUSCH and a first maximum transmit power corresponding to the first TRP;

determining the second PHR based on the actual transmission for the PUSCH and a second maximum transmit power corresponding to the second TRP;

including the first PHR, the first maximum transmit power, the second PHR, and the second maximum transmit power in a MAC control element (MAC CE); and transmitting the PUSCH including the MAC CE.

2. The method of claim 1, further comprising:

wherein the determination to send the first PHR and the second PHR is made when an RRC configuration is received by the UE.

3. The method of claim 1, further comprising:

measuring a first group of pathloss reference signals corresponding to the first TRP and a second group of pathloss reference signals corresponding to the second TRP;

determining to send the first PHR corresponding to the first TRP and the second PHR corresponding to the second TRP, when (a) a first trigger condition is met based on the measurements of the first group of pathloss reference signals or (b) a second trigger condition is met based on the measurements of the second group of pathloss reference signals.

4. The method of claim 3, wherein the first group of pathloss reference signals corresponding to the first TRP are determined from transmission configuration indicator (TCI) states corresponding to the first TRP.

5. The method of claim 3, wherein the second group of pathloss reference signals corresponding to the second TRP are determined from TCI states corresponding to the second TRP.

6. A method of wireless communication of user equipment (UE), comprising determining to send a first power headroom report (PHR) and a second PHR;

receiving a resource allocation for a physical uplink shared channel (PUSCH), wherein the PUSCH is transmitted using a first spatial domain filter corresponding to a first transmission/reception point (TRP);

determining the first PHR based on an actual transmission for the PUSCH and a first maximum transmit power corresponding to the first TRP;

determining the second PHR based on a reference transmission and a second maximum transmit power corresponding to the second TRP;

including the first PHR, the first maximum transmit power, the second PHR, and the second maximum transmit power in a MAC control element (MAC CE); and transmitting the PUSCH including the MAC CE.

7. A method of wireless communication of user equipment (UE) comprising determining to send a first power headroom report (PHR) and a second PHR;

receiving a resource allocation for a physical uplink shared channel (PUSCH), wherein the PUSCH is transmitted using neither a first spatial domain filter corresponding to a first transmit reception point (TRP), nor a second spatial domain filter corresponding to a second TRP;

determining the first PHR based on a reference transmission and a first maximum transmit power corresponding to the first TRP;

determining the second PHR based on a reference transmission and a second maximum transmit power corresponding to the second TRP;

including the first PHR, the first maximum transmit power, the second PHR, and the second maximum transmit power in a MAC control element (MAC CE); and transmitting the PUSCH including the MAC CE.

8. An apparatus for wireless communication, the apparatus being a user equipment (UE), comprising:

a memory; and at least one processor coupled to the memory and configured to:

receive a resource allocation for a physical uplink shared channel (PUSCH), wherein the PUSCH is transmitted using a first spatial domain filter corresponding to a first transmission/reception point (TRP) and a second spatial domain filter corresponding to a second TRP;

determine to send a first power headroom report (PHR) and a second PHR;

determine the first PHR based on an actual transmission for the PUSCH and a first maximum transmit power corresponding to the first TRP;

determine the second PHR based on the actual transmission for the PUSCH and a second maximum transmit power corresponding to the second TRP;

include the first PHR, the first maximum transmit power, and the second PHR, and the second maximum transmit power in a MAC control element (MAC CE); and transmit the PUSCH including the MAC CE.

9. The apparatus of claim 8, wherein the at least one processor is further configured to:

determine to send the first PHR and the second PHR when an RRC configuration is received by the UE.

10. A non-transitory computer-readable medium storing computer executable code for wireless communication of a user equipment (UE), comprising code to:

determine to send a first power headroom report (PHR) and a second PHR;

receive a resource allocation for a physical uplink shared channel (PUSCH), wherein the PUSCH is transmitted using a first spatial domain filter corresponding to a first transmission/reception point (TRP) and a second spatial domain filter corresponding to a second TRP;

determine the first PHR based on an actual transmission for the PUSCH and a first maximum transmit power corresponding to the first TRP;

determine the second PHR based on the actual transmission for the PUSCH and a second maximum transmit power corresponding to the second TRP;

include the first PHR, the first maximum transmit power, and the second PHR, and the second maximum transmit power in a MAC control element (MAC CE); and transmit the PUSCH including the MAC CE.

* * * * *